United States Patent
Dalmatov (10) Patent No.: US 10,853,252 B2
(45) Date of Patent: Dec. 1, 2020

(54) PERFORMANCE OF READ OPERATIONS BY COORDINATING READ CACHE MANAGEMENT AND AUTO-TIERING

(71) Applicant: EMC IP HOLDING COMPANY LLC, Hopkinton, MA (US)

(72) Inventor: Nickolay Dalmatov, St. Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/261,675

(22) Filed: Jan. 30, 2019

(65) Prior Publication Data

US 2020/0242031 A1 Jul. 30, 2020

(51) Int. Cl.
*G06F 12/08* (2016.01)
*G06F 12/0811* (2016.01)
*G06F 12/128* (2016.01)

(52) U.S. Cl.
CPC ........ *G06F 12/0811* (2013.01); *G06F 12/128* (2013.01); *G06F 2212/1024* (2013.01); *G06F 2212/608* (2013.01)

(58) Field of Classification Search
CPC .............. G06F 12/0811; G06F 12/128; G06F 2212/608; G06F 2212/1024
See application file for complete search history.

(56) References Cited

U.S. PATENT DOCUMENTS

| | | | |
|---|---|---|---|
| 9,619,389 B1 * | 4/2017 | Roug | G06F 12/0835 |
| 10,409,729 B1 * | 9/2019 | Naamad | G06F 12/0897 |
| 10,462,012 B1 * | 10/2019 | Rao | G06F 16/214 |
| 2015/0012699 A1 * | 1/2015 | Rizzo | G06F 12/0866 711/113 |
| 2018/0113738 A1 * | 4/2018 | Nichols | G06F 9/5027 |
| 2019/0042424 A1 * | 2/2019 | Nair | G06F 12/0811 |

* cited by examiner

*Primary Examiner* — Hiep T Nguyen
(74) *Attorney, Agent, or Firm* — Anderson Gorecki LLP (57) ABSTRACT

In a hybrid storage array that implements hierarchical storage tiering the eviction of host application data from cache is coordinated with promotion and demotion of host application data between hierarchical storage tiers. Optimal distribution of read cache size per different storage objects may be determined based on cache miss cost. The cost or benefit of promotion and demotion may be determined based on read cache hits and misses.

20 Claims, 4 Drawing Sheets

PERFORMANCE OF READ OPERATIONS BY COORDINATING READ CACHE MANAGEMENT AND AUTO-TIERING

TECHNICAL FIELD

The subject matter of this disclosure is generally related to data storage systems and more particularly to dynamic allocation of resources within such systems to better service read commands.

BACKGROUND

A storage array manages access to host application data stored on non-volatile drives such as SSDs (Solid State Drives) and HDDs (Hard Disk Drives). Some or all the storage capacity of the managed drives is organized by the storage array as a logical production volume on which the host application data is stored. The production volume has contiguous fixed-size LBAs (Logical Block Addresses) that map to non-contiguous physical addresses of the managed drives. The host servers send IO (Input-Output) commands, e.g. SCSI (Small Computer System Interface) commands, to the storage array with reference to the storage space of the production volume. The storage array uses metadata to access the corresponding storage space on the managed drives to service the IO commands. The host application data may be contemporaneously accessed by multiple host servers, each of which may support multiple instances of the host application.

SUMMARY

All examples, aspects and features mentioned in this document can be combined in any technically possible way.

In accordance with an aspect, an apparatus comprises: a plurality of interconnected computing nodes, each of the computing nodes comprising at least one processor and a memory; a plurality of data storage drives on which extents of host application data are stored, each data storage drive connected to at least one of the computing nodes, the data storage drives being organized into a plurality of hierarchical tiers differentiated based on performance; a tiering engine that prompts selected ones of the extents of host application data to be promoted or demoted between the hierarchical tiers; a memory manager that prompts selected ones of the extents of host application data to be copied into or evicted from the shared memory; and a resource manager that coordinates eviction decisions made by the memory manager with promotion and demotion decisions made by the tiering engine. In some implementations the resource manager receives information that indicates on which of the hierarchical tiers the extents of host application data reside. In some implementations the resource manager uses the information to calculate an eviction cost for each of the extents of host application data in one of the memories. In some implementations the calculated eviction cost is provided to the memory manager and the memory manager selects one of the extents of host application data for eviction from one of the memories based on the calculated eviction cost. In some implementations the computing nodes maintain a plurality of storage objects on which the host application data is stored, and the information comprises at least one of: the storage tier on which slices of each storage object resides; per-slice and per storage object read access frequency; per-storage object address space read access frequency distribution; and per-storage object storage tier read access frequency distribution. In some implementations the resource manager receives information that indicates reads to the extents of host application data in the memories, including whether the extents were retrieved from the data storage drives to service the reads. In some implementations the resource manager uses the information to calculate a benefit or cost for promotion or demotion of the extents of host application data in one of the memories. In some implementations the calculated benefit or cost is provided to the tiering engine and the tiering engine selects promotes or demotes host application data based on the calculated benefit or cost. In some implementations the computing nodes maintain a plurality of storage objects on which the host application data is stored, and wherein the information comprises cache hit/miss read information for each storage object.

In accordance with an aspect a method comprises: in a storage array comprising a plurality of interconnected computing nodes, each of the computing nodes comprising at least one processor and a memory; a plurality of data storage drives on which extents of host application data are stored, each data storage drive connected to at least one of the computing nodes, the data storage drives being organized into a plurality of hierarchical tiers differentiated based on performance; a tiering engine that prompts selected ones of the extents of host application data to be promoted or demoted between the hierarchical tiers; and a memory manager that prompts selected ones of the extents of host application data to be copied into or evicted from the shared memory: receiving information from the memory manager; receiving information from the tiering engine; and using the information from the memory manager and the information from the tiering engine to coordinate eviction decisions made by the memory manager with promotion and demotion decisions made by the tiering engine. In some implementations receiving information from the tiering engine comprises receiving information that indicates on which of the hierarchical tiers the extents of host application data reside. Some implementations comprise calculating an eviction cost for each of the extents of host application data in one of the memories based on the information from the tiering engine. Some implementations comprise providing the calculated eviction cost to the memory manager and the memory manager selecting one of the extents of host application data for eviction from one of the memories based on the calculated eviction cost. In some implementations the computing nodes maintain a plurality of storage objects on which the host application data is stored, and the method comprises calculating eviction cost based on at least one of: the storage tier on which slices of each storage object resides; per-slice and per storage object read access frequency; per-storage object address space read access frequency distribution; and per-storage object storage tier read access frequency distribution. In some implementations receiving information from the memory manager comprises receiving information that indicates reads to the extents of host application data in the memories, including whether the extents were retrieved from the data storage drives to service the reads. Some implementations comprise calculating a benefit or cost for promotion or demotion of the extents of host application data in one of the memories based on the information received from the memory manager. Some implementations comprise providing the calculated benefit or cost to the tiering engine and the tiering engine promoting or demoting host application data based on the calculated benefit or cost. In some implementations the computing nodes maintain a plurality of storage objects on which the host application data is stored, and the method comprises receiving information from the memory manager comprises receiving cache hit/miss read information for each storage object.

In accordance with an aspect an apparatus comprises: a storage array comprising a plurality of interconnected computing nodes, each of the computing nodes comprising at least one processor and a memory; a plurality of data storage drives on which extents of host application data are stored, each data storage drive connected to at least one of the computing nodes, the data storage drives being organized into a plurality of hierarchical tiers differentiated based on performance; a tiering engine that prompts selected ones of the extents of host application data to be promoted or demoted between the hierarchical tiers; and a memory manager that prompts selected ones of the extents of host application data to be copied into or evicted from the shared memory; and computer program logic stored on non-transitory memory, comprising: eviction cost calculation instructions that calculate an eviction cost for each of the extents of host application data in one of the memories based on information that indicates on which of the hierarchical tiers the extents of host application data reside; cost/benefit calculation instructions that calculate a benefit or cost for promotion or demotion of the extents of host application data in one of the memories based on information that indicates reads to the extents of host application data in the memories, including whether the extents were retrieved from the data storage drives to service the reads; instructions that evict extents of host application data from one of the memories based on the eviction cost; and instructions that promote or demote extents of host application data to one of the hierarchical tiers based on the calculated benefit or cost for promotion or demotion. In some implementations the computing nodes maintain a plurality of storage objects on which the host application data is stored, and the eviction cost is calculated based on at least one of: the storage tier on which slices of each storage object resides; per-slice and per storage object read access frequency; per-storage object address space read access frequency distribution; and per-storage object storage tier read access frequency distribution; and the benefit or cost for promotion or demotion is calculated based on cache hit/miss read information for each storage object.

Other aspects, features, and implementations may become apparent in view of the detailed description and figures.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines, steps, and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
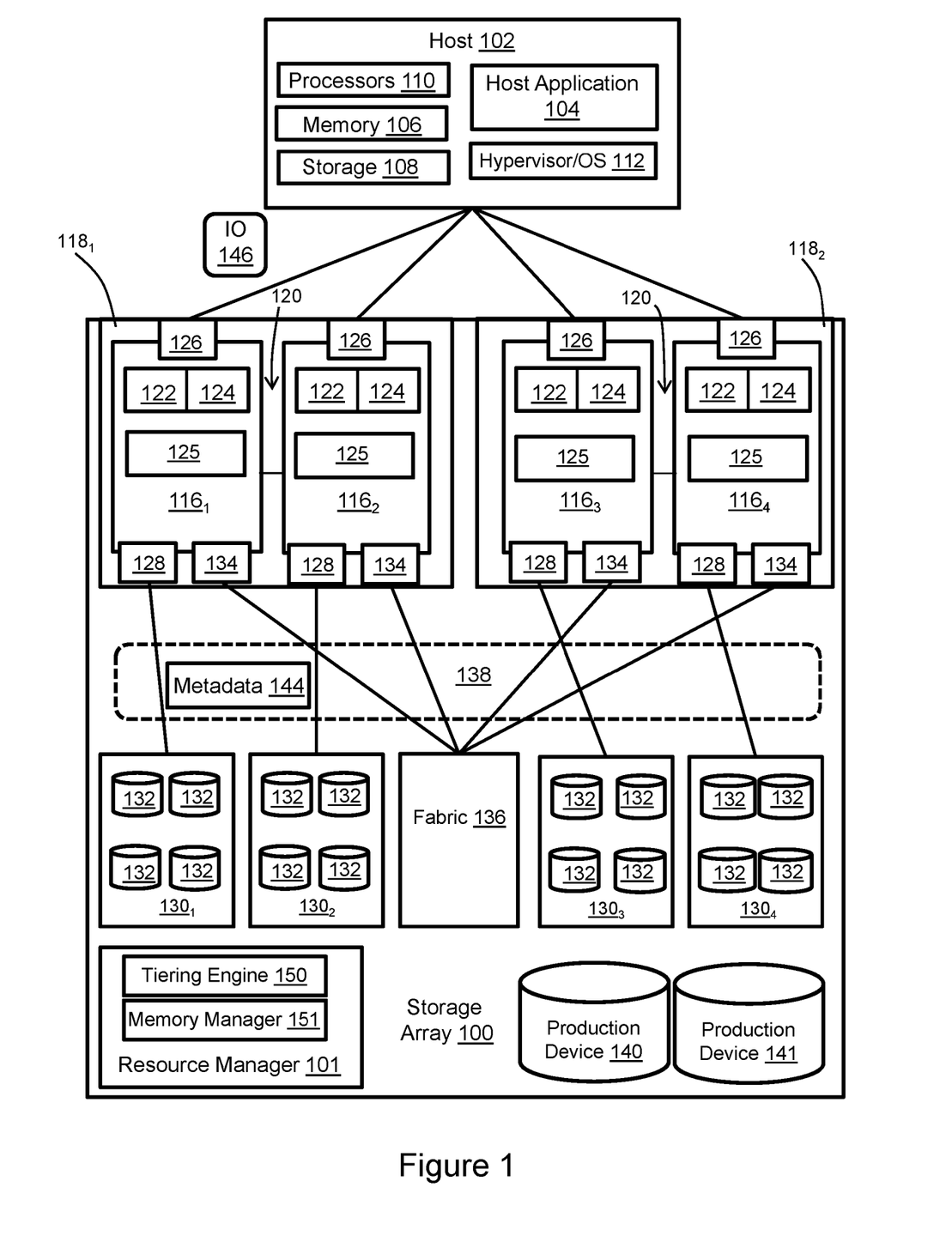
FIG. 1 illustrates a storage array with a resource manager that coordinates a tiering engine and a memory manager.

FIG. 1 illustrates a storage array 100 with a resource manager 101 that coordinates a tiering engine 150 and a memory manager 151. In the illustrated example the storage array 100 is connected to a host 102. There would typically be multiple hosts and multiple storage arrays, but the illustrated example is simplified to facilitate understanding of salient aspects. An overview of operation of the storage array will be described so that operation of the resource manager 101 can be explained in context.

The host 102 may be a type of server computer that includes volatile memory 106, non-volatile storage 108, one or more tangible processors 110, and a hypervisor or OS (Operating System) 112. The volatile memory 106 may include RAM (Random Access Memory) of any type. The non-volatile storage 108 may include drives of one or more technology types, for example, and without limitation, SSDs such as flash, and HDDs such as SATA (Serial Advanced Technology Attachment) and FC (Fibre Channel). Although an external host server is illustrated, internal hosts may be instantiated within the storage array.

The storage array 100 includes a plurality of interconnected computing nodes $116_1$-$116_4$ that maintain data on, and control access to, managed drives 132. Each computing node includes at least one multi-core processor 122 and local volatile memory 125. The computing nodes may also include one or more layers of cache. The local volatile memory 125 may include, for example and without limitation, components such as RAM of any type. Each computing node may also include one or more FAs 126 (Front-end Adapters) for communicating with the host 102. Each computing node $116_1$-$116_4$ may also include one or more BAs 128 (Back-end Adapters) for communicating with respective associated drive arrays $130_1$-$130_4$, thereby enabling access to the managed drives 132. The managed drives 132 may include tangible persistent data storage components of one or more technology types, for example, and without limitation, SSDs such as flash and SCM (Storage Class Memory), and HDDs such as SATA and FC. Each computing node may also include one or more CAs (Channel Adapters) 134 for communicating with other computing nodes via an interconnecting fabric 136. Each computing node may allocate a portion or partition of its respective local volatile memory 125 to a virtual shared memory 138 that can be accessed by other computing nodes, e.g. via DMA (Direct Memory Access) or RDMA (Remote Direct Memory Access). Pairs of the computing nodes, e.g. ($116_1$, $116_2$) and ($116_3$, $116_4$), may be organized as storage engines $118_1$, $118_2$, respectively, for purposes of failover between computing nodes. The paired computing nodes of each storage engine may be directly interconnected by communication links 120.

One function of the storage array 100 is to maintain data for instances of a host application 104 running on the host 102. Specifically, host application data is maintained on the managed drives 132. Examples of host applications may include but are not limited to file servers, email servers, block servers, and databases. The managed drives 132 are not discoverable by the host 102 but the storage array 100 maintains storage objects such as logical production devices 140, 141 that can be discovered and accessed by the host 102. Without limitation, the production devices 140, 141 may be referred to as production volumes, or production LUNs, where LUN (Logical Unit Number) is a number used to identify the logical storage volume in accordance with the SCSI (Small Computer System Interface) protocol. From the perspective of the host 102, each storage object is a single data storage device having a set of contiguous fixed-size LBAs (Logical Block Addresses) on which data used by instances of the host application resides. However, the host application data is stored at non-contiguous addresses on various managed drives 132 that are abstracted by the storage objects.

To service IOs from instances of the host application 104, the storage array 100 maintains metadata 144 that indicates, among various things, mappings between LBAs of the storage objects and addresses with which extents of host application data can be accessed from the shared memory 138 and managed drives 132. In response to a data access instruction from an instance of the host application 104, the hypervisor/OS 112 initially determines whether the instruction can be serviced by accessing the host server memory 106. If that is not possible then an IO 146 is sent from the host 102 to the storage array 100. There are multiple paths between the host 102 and the storage array 100, e.g. one path per FA 126. The paths may be selected based on a wide variety of techniques and algorithms including, for context and without limitation, performance and load balancing. In the case of an IO to read data from production device 140 the storage array uses the metadata 144 to find the requested data in the shared memory 138 or managed drives 132. More particularly, if the requested data is in the shared memory 138 then the IO is serviced without accessing the managed drives but if the requested data is not in the shared memory 138 then the requested data is temporarily copied into the shared memory from the managed drives 132 and then used to service the IO, i.e. reply to the host application with the data via one of the computing nodes. In the case of an IO to write data to production device 140 the storage array copies the data into shared memory, marks the corresponding production device location as dirty in the metadata, and creates new metadata that maps the production device address with a location to which the data is eventually written on the managed drives. The shared memory may enable the storage objects to be reachable via all the computing nodes and paths, although the storage array can be configured to limit use of certain paths to certain production devices.

Figure 2:
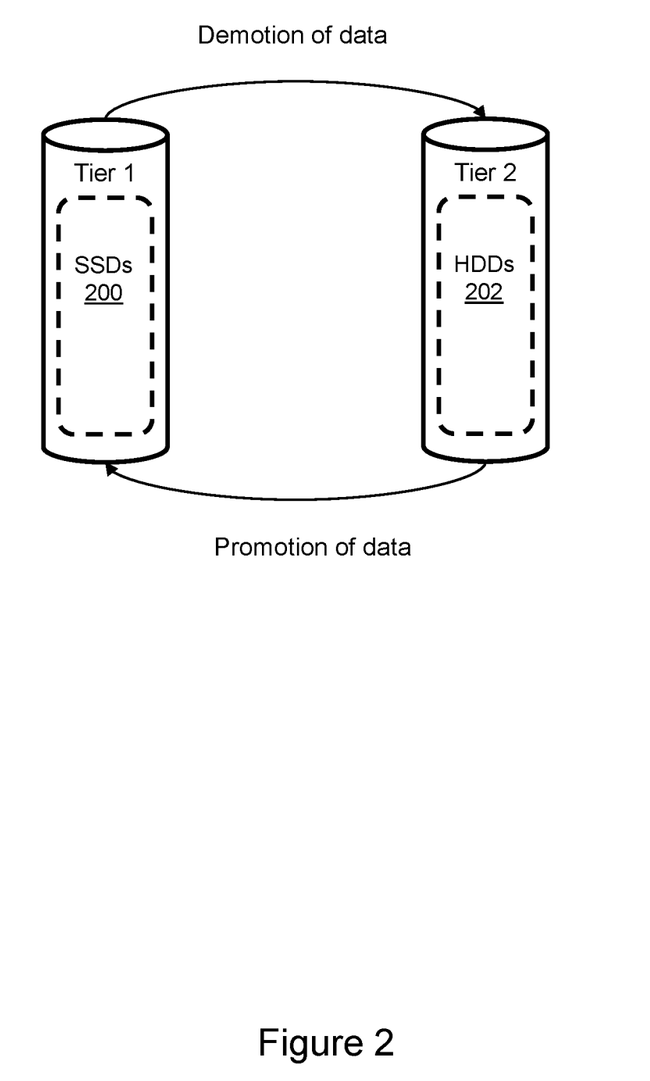
FIG. 2 illustrates data promotion and demotion.

Referring to FIGS. 1 and 2, the managed drives 132 are organized into hierarchical tiers that are differentiated based on performance capabilities, e.g. in terms of IOPS (Input-Output Operations Per Second) that can be serviced. In the illustrated example the managed drives 132 include SSDs 200 and HDDs 202. The SSDs 200 are grouped together as hierarchical tier 1 and the HDDs 202 are grouped together as hierarchical tier 2. Any number of hierarchical tiers might be implemented and the performance capabilities of the managed drives within a hierarchical tier are not necessarily identical. However, different tiers are differentiated from each other based on performance. Due to performance differences, data can be read from and written to tier 1 with less latency than data can be read from and written to tier 2. The tiering engine 150 selects the tier on which each extent of data is placed, including promoting and demoting extents between tiers. Data may be promoted from a lower performing tier to a higher performing tier, e.g. from tier 2 to tier 1. Data may be demoted from a higher performing tier to a lower performing tier, e.g. from tier 1 to tier 2. The tiering engine may include one or more of software and dedicated hardware and may use the processor and memory resources of the computing nodes.

Figure 3:
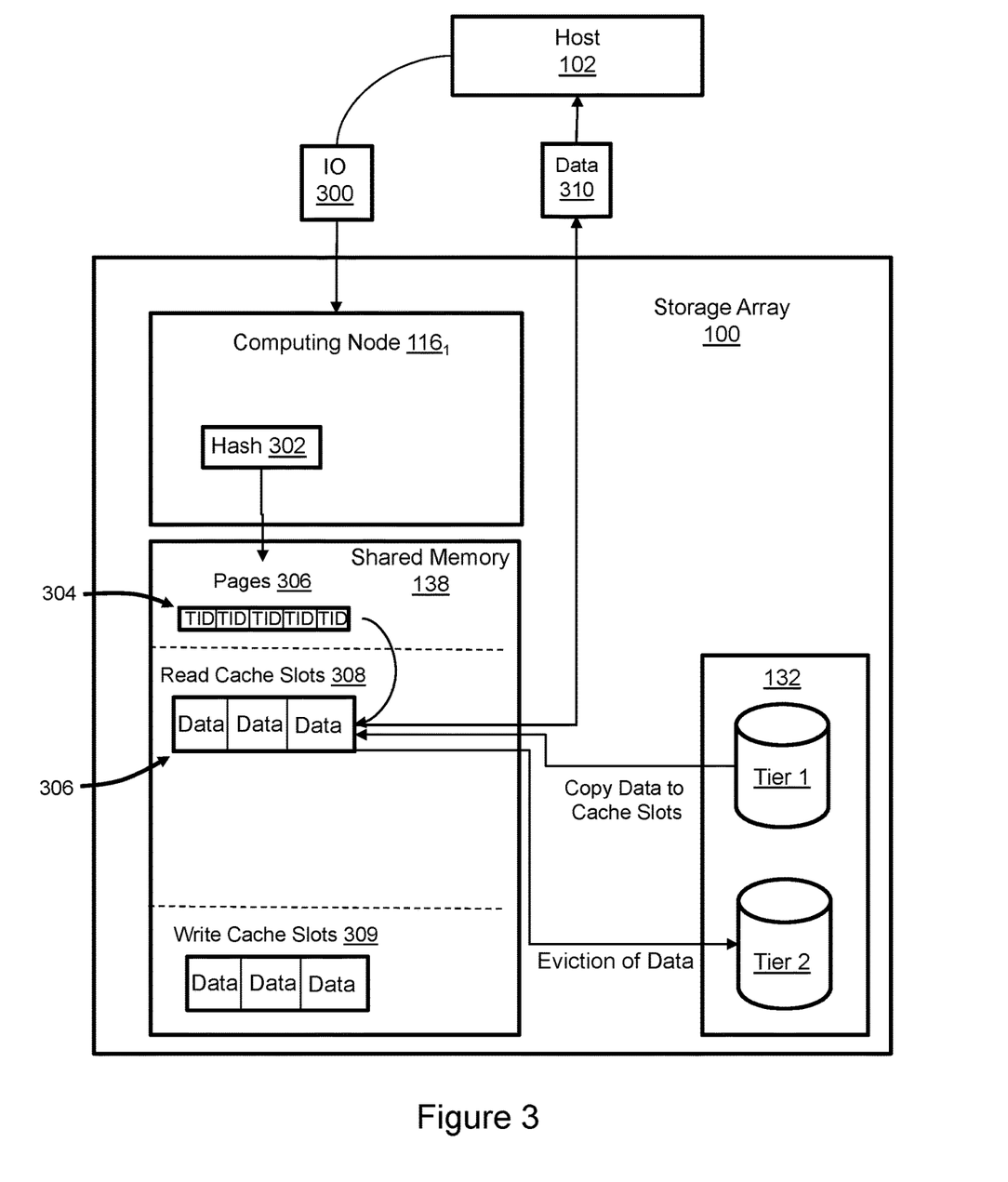
FIG. 3 illustrates a read operation in detail.

FIG. 3 illustrates a read operation in detail. In response an IO 300 sent from the host 102 to the storage array 100 to read data from a storage object, computing node $116_1$ inputs the device number, cylinder number, head (track), and size obtained from the IO 300 into a hash table 302. A wide variety of descriptive data structures could be used, of which a hash table is simply one example. Cached metadata 144 (FIG. 1) may be maintained in TIDs (Track ID Tables) 304 that are stored in fixed-size pages 306 partition of the shared memory 138. The TIDs 304 contain pointers to host application data 306 located in cache slots 308 in the shared memory 138 and managed drives 132. The hash table 302 indicates the locations of the TIDs corresponding to the JO 300 in pages 306 by outputting a corresponding page number. The page number is used to locate the corresponding TIDs. The TIDs include pointers to a read cache slots 308 partition of the shared memory or the managed drives 132. The shared memory 138 also includes a write cache slots 309 partition. The situation in which the TIDs include pointers to the read cache slots 308 is referred to as a "cache hit" because the data is already resident in the read cache. If the TIDs include pointers to the managed drives 132 then the data is not present in the shared memory. This situation is referred to as a "cache miss." In the event of a cache hit the data 310 is obtained from the read cache slots 308 and used to service the IO 300. In the event of a cache miss the data is copied from the managed drives 132 to the read cache slots so that it may be used to service the IO 300. If the portion of the shared memory 138 that is allocated for the read cache slots is full then the memory manager 151 (FIG. 1) selects and evicts other data from the read cache slots so that the data needed to service IO 300 can be copied into the read cache slots. The IO 300 can be serviced with lower latency in the event of a cache hit than a cache miss because of the time required to retrieve data from the managed drives. Moreover, in the event of a cache miss the IO 300 can be serviced with lower latency if the data is in tier 1 rather than tier 2 due to the performance differences between the tiers.

Referring again to FIG. 1, in the absence of coordination the tiering engine 150 and the memory manager 151 operate independently. In typical implementations the tiering engine promotes and demotes multi-block or multi-track slices of storage object data based on statistical information such as frequency of access to the slice within a sliding time window. For example, a slice of data that has been more frequently accessed within a predetermined historical time period inclusive of the present time is considered "hotter" than "colder" slices of data that have been less frequently accessed within the same period of time. Hotter data slices are placed on a higher performing tier of storage and colder data slices are placed on a lower performing tier of storage.

Because access frequency changes over time the use of the sliding time window allows changes in data slice temperature to be identified. Each data slice is promoted or demoted between tiers based on its current statistical temperature relative to other data slices and how much storage capacity is available on each tier (because it may be desirable to fully utilize the higher performing tiers). In typical implementations of memory management, the least recently accessed data is evicted from the cache slots when space must be freed. Memory management may be implemented with allocation units that are smaller than slices, e.g. tracks. Such independent operation of the tiering engine and memory manager can lead to inefficient use of resources. For example, an extent of data that is regularly read over a long period of time, e.g. longer than the sliding time window, may remain in both the shared memory and the highest performing tier of storage for a long period of time, which is wasteful because there is no need to copy the data from the highest performing tier of storage while it can be accessed from the shared memory. In other words, the reliability of cache hits negates some of the value of the data residing on the higher performing tier. In another example in which two extents of data in the shared memory have similar age but are stored on different tiers the eviction of the extent stored on the lower performing tier may incur a greater cost than eviction of the extent stored on the higher performing tier in terms of latency when paging the extents in from the managed drives. The resource manager 101 coordinates the tiering engine 150 and the memory manager 151 to mitigate such problems.

Figure 4:
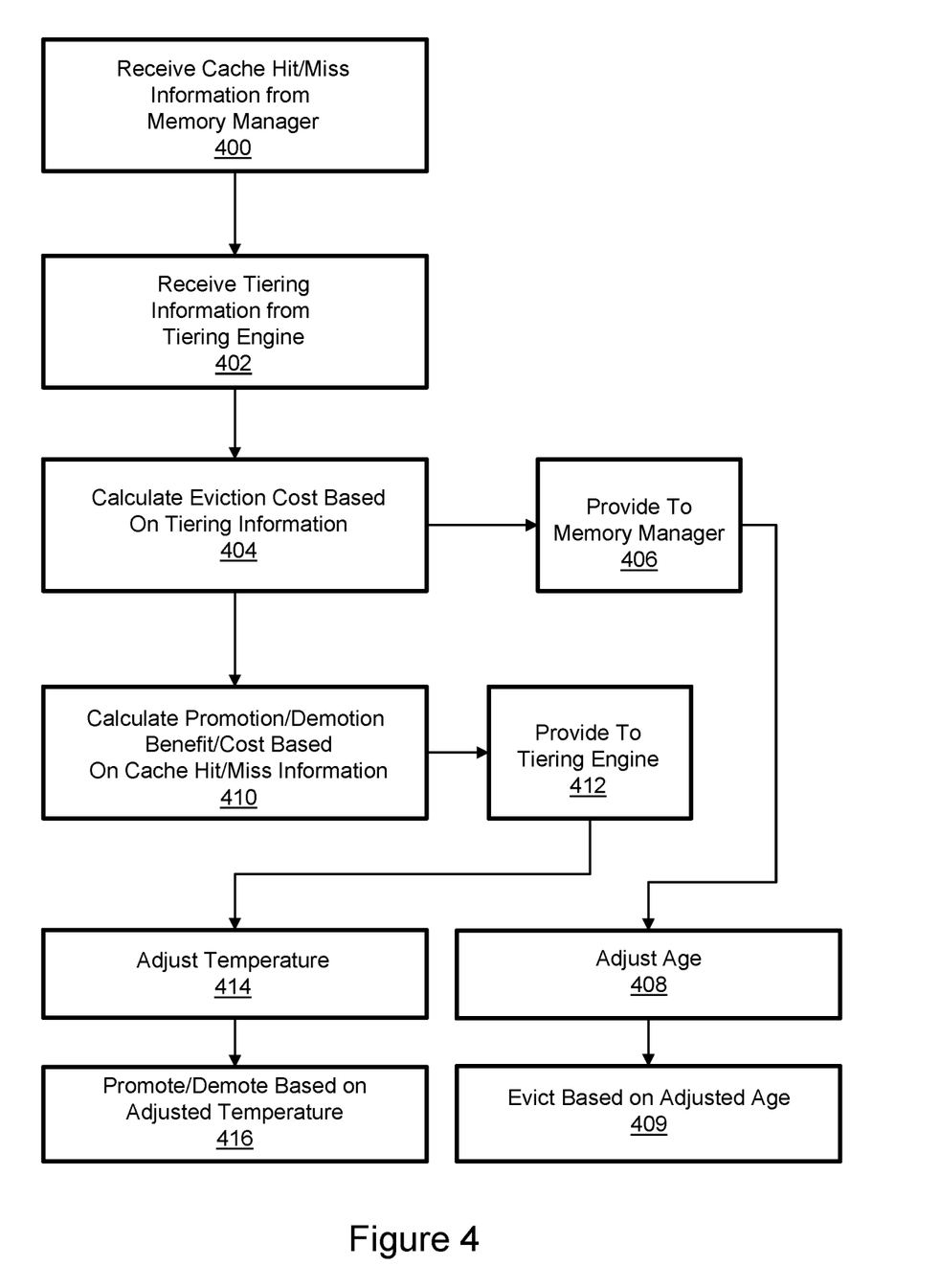
FIG. 4 illustrates operation of the resource manager in greater detail.

FIG. 4 illustrates operation of the resource manager 101. As indicated in step 400 the resource manager receives cache hit/miss information from the memory manager. The cache hit/miss information may include a historical representation of cache hits and misses for each storage object maintained by the storage array. The per-storage object cache hit/miss information may be limited to reads, i.e. exclude writes. The per-storage object cache hit/miss information may also indicate hits and misses for each slice, track, or block of the storage object, e.g. average per unit time within a sliding time window of predetermined duration, and for both data and metadata. As indicated at step 402 the resource manager receives tiering information from the tiering engine. The tiering information may include a representation of the storage tier on which each slice of each storage object resides, per-slice and per storage object read access frequency (RAF or read temperature), per storage object address space read access frequency distribution, and per storage object storage tier read access frequency distribution. As indicated at step 404 the resource manager calculates eviction costs based on the tiering information. The eviction costs may be calculated on a per-storage object, per-slice, per-track or other basis, e.g. indicating the cost of a subsequent read cache miss in terms of latency for retrieval of the evicted data from the storage tier to which it will be evicted. The resource manager may also calculate a target per-storage object read cache size distribution, i.e. separate allocations of the read cache for each storage object maintained by the storage array. As indicated at step 406 the calculated eviction costs are provided to the memory manager. The memory manager uses the calculated eviction costs to adjust the ages of data in the selected allocation units as indicated in step 408. The memory manager then evicts allocation units of data from the read cache, as needed, based on adjusted age as indicated in step 409. Thus, a first allocation unit of data that is the oldest (time since most recent access) in the shared memory may have an adjusted age that is lower than another allocation unit of data that was more recently accessed. In some implementations the age may be adjusted by the latency of the storage tier. As indicated in step 410 the resource manager calculates the net cost/benefit of promotion and demotion of each slice of each storage object to each other storage tier based on the cache hit/miss information. As indicated in step 412 the calculated net cost/benefit of promotion and demotion of each slice is provided to the tiering engine. The tiering engine uses the net cost/benefit information to adjust slice access temperatures as indicated in step 414 and promotes and demotes slices based on the adjusted temperature as indicated in step 416. Thus, a slice that has a relatively high temperature based on read access frequency may have a cooler adjusted temperature if there is little or no net cost associated with demotion of the object to a lower performing tier. Because of operation of the resource manager 101 the tiering decisions made by the tiering engine are enhanced by coordination with the eviction decisions made by the memory manager and vice versa.

Various features, aspects, and implementations have been described using specific examples. However, those specific examples are not intended to limit the scope of the invention. A wide variety of different implementations, modifications, and combinations may be made without departing from the scope of the inventive concepts described herein. Accordingly, those modifications and combinations are within the scope of the following claims.

What is claimed is:

1. An apparatus comprising:
a plurality of interconnected computing nodes, each of the computing nodes comprising at least one processor and a local memory, a portion of the local memory allocated to a shared memory that is accessible to other ones of the computing nodes;
a plurality of data storage drives on which extents of host application data are stored, each data storage drive connected to at least one of the computing nodes, the data storage drives being organized into a plurality of hierarchical tiers differentiated based on performance;
a tiering engine that prompts selected ones of the extents of host application data to be promoted or demoted between the hierarchical tiers;
a memory manager that prompts selected ones of the extents of host application data to be copied into or evicted from the shared memory; and
a resource manager that coordinates eviction decisions made by the memory manager with promotion and demotion decisions made by the tiering engine.

2. The apparatus of claim 1 wherein the resource manager receives information that indicates on which of the hierarchical tiers the extents of host application data reside.

3. The apparatus of claim 2 wherein the resource manager uses the information to calculate an eviction cost for each of the extents of host application data in one of the memories.

4. The apparatus of claim 3 wherein the calculated eviction cost is provided to the memory manager and the memory manager selects one of the extents of host application data for eviction from one of the memories based on the calculated eviction cost.

5. The apparatus of claim 4 wherein the computing nodes maintain a plurality of storage objects on which the host application data is stored, and wherein the information comprises at least one of: the storage tier on which slices of each storage object resides; per-slice and per storage object read access frequency; per-storage object address space read access frequency distribution; and per-storage object storage tier read access frequency distribution.

6. The apparatus of claim 1 wherein the resource manager receives information that indicates reads to the extents of host application data in the memories, including whether the extents were retrieved from the data storage drives to service the reads.

7. The apparatus of claim 6 wherein the resource manager uses the information to calculate a benefit or cost for promotion or demotion of the extents of host application data in one of the memories.

8. The apparatus of claim 7 wherein the calculated benefit or cost is provided to the tiering engine and the tiering engine selects promotes or demotes host application data based on the calculated benefit or cost.

9. The apparatus of claim 8 wherein the computing nodes maintain a plurality of storage objects on which the host application data is stored, and wherein the information comprises cache hit/miss read information for each storage object.

10. A method comprising:
in a storage array comprising a plurality of interconnected computing nodes, each of the computing nodes comprising at least one processor and a local memory, a portion of the local memory allocated to a shared memory that is accessible to other ones of the computing nodes; a plurality of data storage drives on which extents of host application data are stored, each data storage drive connected to at least one of the computing nodes, the data storage drives being organized into a plurality of hierarchical tiers differentiated based on performance; a tiering engine that prompts selected ones of the extents of host application data to be promoted or demoted between the hierarchical tiers; and a memory manager that prompts selected ones of the extents of host application data to be copied into or evicted from the shared memory:
receiving information from the memory manager;
receiving information from the tiering engine; and
using the information from the memory manager and the information from the tiering engine to coordinate eviction decisions made by the memory manager with promotion and demotion decisions made by the tiering engine.

11. The method of claim 10 wherein receiving information from the tiering engine comprises receiving information that indicates on which of the hierarchical tiers the extents of host application data reside.

12. The method of claim 11 comprising calculating an eviction cost for each of the extents of host application data in one of the memories based on the information from the tiering engine.

13. The method of claim 12 comprising providing the calculated eviction cost to the memory manager and the memory manager selecting one of the extents of host application data for eviction from one of the memories based on the calculated eviction cost.

14. The method of claim 13 wherein the computing nodes maintain a plurality of storage objects on which the host application data is stored, and comprising calculating eviction cost based on at least one of: the storage tier on which slices of each storage object resides; per-slice and per storage object read access frequency; per-storage object address space read access frequency distribution; and per-storage object storage tier read access frequency distribution.

15. The method of claim 10 wherein receiving information from the memory manager comprises receiving information that indicates reads to the extents of host application data in the memories, including whether the extents were retrieved from the data storage drives to service the reads.

16. The method of claim 15 comprising calculating a benefit or cost for promotion or demotion of the extents of host application data in one of the memories based on the information received from the memory manager.

17. The method of claim 16 comprising providing the calculated benefit or cost to the tiering engine and the tiering engine promoting or demoting host application data based on the calculated benefit or cost.

18. The method of claim 17 wherein the computing nodes maintain a plurality of storage objects on which the host application data is stored, and wherein receiving information from the memory manager comprises receiving cache hit/miss read information for each storage object.

19. An apparatus comprising:
a storage array comprising a plurality of interconnected computing nodes, each of the computing nodes comprising at least one processor and a local memory, a portion of the local memory allocated to a shared memory that is accessible to other ones of the computing nodes; a plurality of data storage drives on which extents of host application data are stored, each data storage drive connected to at least one of the computing nodes, the data storage drives being organized into a plurality of hierarchical tiers differentiated based on performance; a tiering engine that prompts selected ones of the extents of host application data to be promoted or demoted between the hierarchical tiers; and a memory manager that prompts selected ones of the extents of host application data to be copied into or evicted from the shared memory; and
computer program logic stored on non-transitory memory, comprising:
eviction cost calculation instructions that calculate an eviction cost for each of the extents of host application data in one of the memories based on information that indicates on which of the hierarchical tiers the extents of host application data reside;
cost/benefit calculation instructions that calculate a benefit or cost for promotion or demotion of the extents of host application data in one of the memories based on information that indicates reads to the extents of host application data in the memories, including whether the extents were retrieved from the data storage drives to service the reads;
instructions that evict extents of host application data from one of the memories based on the eviction cost; and
instructions that promote or demote extents of host application data to one of the hierarchical tiers based on the calculated benefit or cost for promotion or demotion.

20. The apparatus of claim 19 wherein the computing nodes maintain a plurality of storage objects on which the host application data is stored,
wherein the eviction cost is calculated based on at least one of: the storage tier on which slices of each storage object resides; per-slice and per storage object read access frequency; per-storage object address space read access frequency distribution; and per-storage object storage tier read access frequency distribution; and wherein the benefit or cost for promotion or demotion is calculated based on cache hit/miss read information for each storage object.

\* \* \* \* \*